United States Patent [19]

Drisko et al.

[11] 3,891,583

[45] June 24, 1975

[54] QUICK SETTING ADHESIVE FOR APPLICATION UNDERWATER

[75] Inventors: Richard W. Drisko, Oxnard; Joseph B. Crilly, Camarillo, both of Calif.

[73] Assignee: The United States of America as represented by the Secretary of the Navy, Washington, D.C.

[22] Filed: Feb. 25, 1974

[21] Appl. No.: 445,171

[52] U.S. Cl.............................. 260/18 EP; 260/37 EP
[51] Int. Cl.............................................. C08q 51/72
[58] Field of Search ...................... 260/37 EP, 18 EP

[56] References Cited
UNITED STATES PATENTS

| | | | |
|---|---|---|---|
| 3,352,810 | 11/1967 | Cameron et al. | 260/37 EP X |
| 3,355,512 | 11/1967 | De Acetis et al. | 260/37 EP X |
| 3,363,026 | 1/1968 | Schroll | 260/37 EP X |
| 3,773,703 | 11/1973 | Smeal | 260/37 EP X |

OTHER PUBLICATIONS

Lee et al.; Handbook of Epoxy Resins; McGraw-Hill Book Co.; 1967; pp. 14–24; 16–21;22,23; 21–10/23, 28, 34, 43; Sci. Lib., TP 1180.E6L4.

*Primary Examiner*—Lewis T. Jacobs
*Attorney, Agent, or Firm*—Richard S. Sciascia; Joseph M. St. Amand

[57] ABSTRACT

A two-component, rapid curing epoxy adhesive for use underwater; the adhesive, which is not activated by water, displaces water on the underwater surfaces and bonds tightly and permanently thereto. One component consists of viscous liquid epoxy and the other component contains a high functionality liquid polymercaptan resin and 2,4,6-Tri(dimethyl aminomethyl) phenol, plus a wetting agent and fillers.

9 Claims, No Drawings

QUICK SETTING ADHESIVE FOR APPLICATION UNDERWATER

BACKGROUND OF THE INVENTION

There are no adhesives currently available for use underwater. While a number of thick, putty-like coatings, i.e., splash-zone compounds, are available for protective coatings on steel, wood or concrete, they are not suitable as underwater bonding agents because of their very slow reaction times and do not have the necessary reactivity to cure at temperatures below 60°F or react fast enough for use as an adhesive. There are also a number of known epoxy adhesive compositions available, but heretofore none have been suitable for underwater application and use. In addition to being unsuited to underwater applications, the prior compositions are either very slow curing, slow reacting, require high curing temperatures, or water activation.

There has been a need for one or more adhesive formulations suitable for bonding structures under seawater for some time. Different applications for such formulations include: attachment of explosive packages underwater, underwater salvage, and underwater construction and repair. The desired physical properties for an underwater adhesive will vary with the use. Thus, an adhesive for attachment of an explosive device must be vary rapid curing but high strength is not so important. Conversely, an adhesive used in underwater construction need not be very rapid curing, but high bonding strength is desired. It should be noted that water temperatures, and thus adhesive curing rates, may vary greatly from location to location. Some surface waters may be at 70°F (21°C) or greater, while deep waters may get as cold as 40°F (5°C) or more. As a rule of thumb, many chemical reactions double their rates for each 10°C rise in temperature. Also, viscosity of adhesive generally varies greatly with temperatures so that an adhesive that can be manually mixed in a partitioned plastic bag underwater at 70°F might be too stiff for easy mixing at colder temperatures. Heat packs might be advantageously used both in the mixing of adhesive components and in curing of the mixed product. In any event, practical use of an underwater adhesive requires a system that: can be readily carried, mixed, and applied underwater; will have the necessary viscosity for mixing and application; will readily displace water to coat the surfaces to be bonded together; will cure in an appropriate period of time; and will have the physical strength required for the intended purposes.

Epoxy-polyamine formulations were previously studied and shown to be readily applied underwater and to develop bonding strengths to steel of 1,000 psi or more after one week. However, such formulations were not suitable because of the slow curing rates and their limitations to use only in waters above 60°F in temperature.

SUMMARY OF THE INVENTION

The present invention for a quick setting adhesive can be applied underwater, cures very rapidly (i.e., in a few minutes to a few hours) at temperatures ranging from freezing to 80°F or higher to a hardened, nonflexible mass, displaces water on the substrate surfaces, and bonds tightly and permanently to the underwater surfaces. The present adhesive provides a faster and simpler means for underwater joining than welding, bolting or other conventional procedures.

It is accordingly an object of the invention to provide a quick setting adhesive for application underwater.

Another object is to provide a two-component adhesive for underwater application comprising a viscous liquid epoxy component and a high functionality liquid polymercaptan resin formulation.

A further object of the invention is to provide a two-component adhesive for rapid curing and strong bonding underwater.

Other objects, advantages and novel features of the invention will become apparent from the following detailed description of the invention.

DETAILED DESCRIPTION OF THE PREFERRED EMBODIMENT

The adhesive of this invention consists of a two-component formulation that must be mixed dry but can then be applied underwater. Dry-mixing underwater can be achieved by use of an envelope, tube, or other container divided into two compartments. Immediately prior to use, the partition between the compartments is removed, and the two adhesive components are kneaded or otherwise mixed together to a uniform blend. The container is then opened so that the mixed adhesive can be extruded from it onto the structure or apperatus to be bonded.

The two component adhesive consists of reactive materials that will produce the desired properties after mixing. Two examples of such formulations are given below:

EXAMPLE 1

| Component A | Parts by Weight |
|---|---|
| Viscous liquid epoxy polymer* | 100 |
| Component B | |
| High functionality liquid polymercaptan resin (accelerator) | 100 |
| 2,4,6-Tri(dimethylaminomethyl)phenol (curing agent) | 10 |
| Blown fish oil (wetting agent) | 20 |
| Powdered asbestos | 47 |
| Carbon black | 0.05 |
| Beta-(3,4-epoxycyclohexyl)-ethyl-trimethoxysilane (bonding agent) | 2 |

EXAMPLE 2

| Component A | Parts by Weight |
|---|---|
| Viscous liquid epoxy polymer* | 100 |
| Component B | |
| High functionality liquid polymercaptan resin | 100 |
| 2,4,6-tri(dimethylaminomethyl)phenol | 6 |
| Viscous liquid polyamide resin (curing agent) | 18 |
| Blown fish oil | 20 |
| Powdered asbestos | 16 |
| Carbon black | 0.05 |

EXAMPLE 3

| Component A | Parts by Weight |
|---|---|
| Viscous liquid epoxy polymer* | 100 |
| Component B | |

-Continued

| Component A | Parts by Weight |
|---|---|
| High functionality liquid polymer-captan resin (accelerator) | 100 |
| 2,4,6-tri(dimethylaminomethyl)phenol (curing agent) | 10 |
| Blown fish oil (wetting agent) | 20 |
| Fire-dried fumed silica having a surface area between 200 and 400 square meters per gram (thixotropic agent) | 5 |
| Carbon black | 0.01 |

\* e.g., polyfunctional polymer derived by the condensation polymerization of bisphenol A and epichlorohydrin, having an epoxide equivalent of approximately 190, a viscosity of about 125 poises at 25°C, and specific gravity of about 1.18 at 25°C; and, especially for use in cold temperatures, polyfunctional polymer derived by the condensation polymerization of bisphenol A and epichlorohydrin, having an epoxide equivalent of approximately 180, a viscosity of about 5 to 7 poises, specific gravity of 1.13 at 25°C, and containing from 10.5 to 11.5% butyl glycidyl ether.

Components A and B can be mixed within a suitable container, underwater, to a uniform blend. The adhesive is then extruded from the container and spread onto cleaned surfaces of the underwater structures to be bonded. The wetting agent in the adhesive formulation helps the spreading of the adhesive onto the underwater surfaces. Surfaces coated with the adhesive are pressed together and allowed to cure at relatively low underwater temperatures. The adhesive cures quickly, in from about 5 to 30 minutes, depending upon the temperature of the water and exact formulation to form a strong bond. Two hours of curing will produce a very strong bond.

When mixed in 100 gram masses, adhesives like Examples 1 through 3 have set up in water at 70°F in 5 to 10 minutes, and in water at 40°F in two to three times this time. When applied underwater to cleaned steel, bonding strengths of 300 pounds per square inch or more can be produced after one-half hour of curing, and 700 pounds per square inch or more can be produced after 2 hours of curing. The formulation can be varied some to change both the curing time and bonding strength of the adhesive.

Obviously, many modifications and variations of the present invention are possible in light of the above teachings. It is therefore to be understood that within the scope of the appended claims, the invention may be practiced otherwise than as specifically described.

We claim:

1. A rapid-curing, epoxy adhesive for application on underwater structures and use underwater, comprising:
   a. approximately 100 parts by weight of a viscous liquid epoxy polymer;
   b. approximately 100 parts by weight of a high functionality liquid polymercaptan resin;
   c. 6 to 10 parts by weight of 2,4,6-tri (dimethylaminomethyl)phenol;
   d. 18 to 20 parts by weight of blown fish oil;
   e. 0.01 to 0.05 parts by weight of carbon black;
   f. 0 to 2 parts by weight of beta-(3,4-epoxycyclohexyl-ethyltrimethoxysilane; and
   g. a thixotropic agent;
   h. said viscous liquid epoxy polymer consisting of a polyfunctional polymer derived by the condensation polymerization of bisphenol A and epichlorohydrin, having an epoxide equivalent of approximately 190, a viscosity of about 125 poises at 25°C, and specific gravity of about 1.18 at 25°C;
   i. said components being mixed together to a uniform blend immediately prior to use, and not being activated by water;
   j. said adhesive compound displacing water and adhering well to cleaned surfaces or underwater structures when applied thereto and spread thereon underwater; and
   k. said adhesive curing at from approximately 0°F to 80°F in from about 5 to 30 minutes to form a strong bond, and forming a very strong bond within 2 hours.

2. An adhesive composition as in claim 1 wherein a bonding strength of at least 300 pounds per square inch is produced after 30 minutes of curing when applied underwater to cleaned steel.

3. An adhesive composition as in claim 1 wherein a bonding strength of at least 700 pounds per square inch is produced after 2 hours of curing when applied underwater to cleaned steel.

4. An adhesive composition as in claim 1 wherein said thixotropic agent consists of 16 to 47 parts by weight of powdered asbestos.

5. A rapid-curing epoxy adhesive for application on underwater structures and use underwater, comprising:
   a. approximately 100 parts by weight of a viscous liquid epoxy polymer;
   b. approximately 100 parts by weight of a high functionality liquid polymercaptan resin;
   c. 6 to 10 parts by weight of 2,4,6-tri (dimethylaminomethyl)phenol;
   d. 18 to 20 parts by weight of blown fish oil;
   e. 0.01 to 0.05 parts by weight of carbon black; and
   f. 0 to 2 parts by weight of beta-(3,4-epoxycyclohexyl)-ethyltrimethoxysilane; and
   g. a thixotropic agent;
   h. said viscous liquid epoxy polymer consisting of a polyfunctional polymer derived by the condensation polymerization of bisphenol A and epichlorohydrin, having an epoxide equivalent of approximately 180, a viscosity of about 5 to 7 poises, a specific gravity of about 1.13 at 25°C, and containing from 10.5 to 11.5% butyl glycidyl ether;
   i. said components being mixed together to a uniform blend immediately prior to use, and not being activated by water;
   j. said adhesive compound displacing water and adhering well to cleaned surfaces of underwater structures when applied thereto and spread thereon underwater; and
   k. said adhesive curing at from approximately 0°F to 80°F in from about 5 to 30 minutes to form a strong bond, and forming a very strong bond within 2 hours.

6. An adhesive composition as in claim 5 wherein a bonding strength of at least 300 pounds per square inch is produced after 30 minutes of curing when applied underwater to cleaned steel.

7. An adhesive composition as in claim 5 wherein a bonding strength of at least 700 pounds per square inch is produced after 2 hours of curing when applied underwater to cleaned steel.

8. An adhesive composition as in claim 1 also having approximately 18 parts by weight of viscous liquid polyamide resin mixed therein.

9. An adhesive as in claim 5 wherein said thixotropic agent consists of 5 parts by weight of fire-dried fumed silica having a surface area between 200 and 400 square meters per gram.

* * * * *